United States Patent
Lewis et al.

(10) Patent No.: US 6,532,490 B1
(45) Date of Patent: Mar. 11, 2003

(54) METHODS AND ELEMENTS TO REDUCE THE NUMBER OF QUIERIES TO A FOREIGN NETWORK ELEMENT

(75) Inventors: John E. Lewis, Lawrenceville, GA (US); Saurel Quettan, Lithonia, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 1 day.

(21) Appl. No.: 09/594,177

(22) Filed: Jun. 13, 2000

(Under 37 CFR 1.47)

Related U.S. Application Data

(63) Continuation of application No. 09/437,636, filed on Nov. 10, 1999.

(51) Int. Cl.$^7$ ............................................... G06F 15/16
(52) U.S. Cl. ..................... 709/217; 709/213; 709/248; 711/113; 711/118; 711/133
(58) Field of Search ................................. 709/217, 218, 709/219, 213, 214, 246, 248; 711/118, 113, 133, 137, 141

(56) References Cited

U.S. PATENT DOCUMENTS

| | | | |
|---|---|---|---|
| 4,680,785 A | | 7/1987 | Akiyama et al. |
| 5,430,719 A | | 7/1995 | Weisser, Jr. |
| 5,511,111 A | | 4/1996 | Serbetcioglu et al. |
| 5,533,096 A | | 7/1996 | Bales |
| 5,579,375 A | | 11/1996 | Ginter |
| 5,682,500 A | * | 10/1997 | Vishlitzky et al. |
| 5,745,852 A | | 4/1998 | Khan et al. |
| 5,796,806 A | | 8/1998 | Birckbichler |
| 5,815,810 A | | 9/1998 | Gallant et al. |
| 5,860,153 A | * | 1/1999 | Matena et al. ............... 711/216 |
| 6,016,512 A | * | 1/2000 | Huitema ..................... 709/245 |
| 6,119,167 A | * | 9/2000 | Boyle et al. ................. 709/234 |
| 6,172,981 B1 | * | 1/2001 | Cox et al. ................... 370/401 |
| 6,205,489 B1 | * | 3/2001 | Kapoor ....................... 709/245 |
| 6,275,819 B1 | * | 8/2001 | Carter .......................... 707/2 |

* cited by examiner

*Primary Examiner*—Ario Etienne
(74) *Attorney, Agent, or Firm*—Kilpatrick Stockton LLP

(57) ABSTRACT

Queries and responses between network elements and a foreign network element are intercepted. As responses from the foreign network element are intercepted, the data from a response is stored so as to build a local cache of retrieved data. In response to the interception of a query, a check is made to determine whether the data sought by the query is stored in the local cache. If the data is stored in the local cache, an integrity check with respect to the data may be carried out. If the integrity check is passed, then the data is returned to the appropriate network element without the query having been transmitted to or the data obtained from the foreign network element. If the integrity check is not passed, or if the data is not stored in the local cache, then the data is obtained or updated from the foreign network element. Advantageously, the data obtained from the foreign network element is added to the local cache so that a subsequent query for the same data does not have to be transmitted to the foreign network element. Rather, if the integrity check is passed, the data is supplied from the local cache.

30 Claims, 5 Drawing Sheets

METHODS AND ELEMENTS TO REDUCE THE NUMBER OF QUIERIES TO A FOREIGN NETWORK ELEMENT

RELATED APPLICATION DATA

This application is a continuation of U.S. application Ser. No. 09/437,636, filed with the U.S. Patent Office on Nov. 10, 1999.

FIELD OF THE INVENTION

The field of the present invention relates to data exchange in communications systems, and particularly, relates to reductions in the data exchange among elements in a communication systems without sacrificing the accuracy of the data.

BACKGROUND OF THE INVENTION

The recipient of a letter generally may gain information as to the identity of the sender without opening the letter simply by checking the return address if it is included on the envelope. In telecommunications, gaining information as to the identity of a calling party without answering the call is not so simple. The recipient of a telephone call generally may gain information as to the identity of a calling party if the recipient subscribes to a caller identification (CallerID) feature or service. Conveniently, the CallerID feature displays a directory number, a name, or other information on the display of the communications unit the subscriber may be using. To implement features such as the CallerID feature, a service provider may set up a database including information correlated respectively to directory numbers served by the service provider. For example, a service provider may set up a database to include all of the directory numbers that are served by that service provider. With respect to each directory number, the service provider may include correlative information such as a name, message, or other data to provide for display on the subscriber's unit when the subscriber receives a call from a calling party having a directory number in the service provider's database. The database including the directory numbers served by the service provider and the correlative information often is referred to as a "calling name database", and more particularly, a "native" calling name database or native database because the database includes directory numbers for subscribers who are "native" to (i.e. served by) the service provider. Typically, a native database is included in a network element such as a service control point (SCP) in the network or system of the service provider.

The native database works well for implementing features such as CallerID when both the recipient of the call and the calling party are served by the same service provider. When the call reaches a service switching point (SSP) serving the recipient, the processing of the call is paused in response to the presence of a terminating attempt trigger (TAT) associated with the directory number of the recipient. The SSP queries another network element such as the SCP for instructions. In response to the query, the SCP checks information associated with the directory number of the recipient and finds the directory number is to be provided with the CallerID feature. The SCP then checks the native database for the correlative information associated with the calling line number from which the call originated. Given that the calling party is served by the service provider, the native database includes the calling line number from which the call originated. The native directory also includes correlative information for the calling line number. The SCP transmits the correlative information to the SSP for further routing to and display on the recipient's communications unit.

The native database is insufficient for implementing features such as CallerID when the calling party is not served by the same service provider as the recipient of the call. The native database is insufficient because it typically does not include directory numbers and correlative information other than for those directory numbers the service provider serves. To obtain correlative information about a calling line number that is not served by the service provider serving the recipient, the service provider often must consult with the service provider serving the calling party, which is referred to herein as the foreign service provider. In particular, a database of the foreign service provider may be consulted. To the foreign service provider, the consulted database is a native database. But from the perspective of the consulting service provider, the database is a foreign database, as it is referred to herein.

Generally, a foreign service provider charges a fee for responding to each query that is received from another service provider. These fees add up, and thus, service providers seek ways in which to minimize the number of queries routed to foreign databases.

One way to completely minimize the number of queries is to avoid having to make them. For example, with respect to the CallerID feature, a service provider may add correlative information to its native database or may add another database with such correlative information so that the service provider is in possession of all necessary information relating to directory numbers that may be associated with calls to subscribers of the service provider. This solution is impractical at least because it may be impossible for a service provider to obtain and store all the necessary directory numbers and correlative information. This solution also may be unacceptable unless the service provider receives regular and timely updates of the correlative information. If the updates are not received in a timely fashion, the service provider may provide out-of-date information as CallerID information to its subscribers. The provision of out-of-date information may result in a subscriber's dissatisfaction with the CallerID feature and a cancellation of his or her subscription. In addition, this solution is relatively expensive in that it requires the service provider to obtain, store, and update a large number of directory numbers and a large amount of correlative information.

Accordingly, there is a need for a system that obtains information from foreign databases in a cost effective and a timely manner. There is also a need for a system that obtains such information without sacrificing or only minimally affecting the accuracy of the information. There is further a need for a system that obtains such information in a manner whose particulars as to cost effectiveness, timeliness, and accuracy may be selected by the service provider. In addition, there is a need for a system that obtains such information and dynamically changes the manner in which it obtains additional information based on the information already obtained.

SUMMARY

Generally stated, the present invention includes exemplary embodiments that intercept queries and responses between network elements and a foreign network element. As responses from the foreign network element are intercepted, the data from the response is stored so as to build a local cache of retrieved data. In response to the interception of a query, a check is made to determine whether the data sought by the query is stored in the local cache. If the data is stored in the local cache, an integrity check(s) with respect to the data may be carried out. The integrity check(s) may be implemented so that the data in the local cache has a better probability of being substantially the same as the corresponding data in the foreign network element. If the integrity check is passed, then the data is returned to the appropriate network element without the query having been transmitted to or the data obtained from the foreign network element.

If the integrity check is not passed, or if the data is not stored in the local cache, then the data is obtained from the foreign network element. Advantageously, the data obtained from the foreign network element is added to the local cache so that a subsequent query for the same data does not have to be transmitted to the foreign network element. Rather, if the integrity check is passed, the data is supplied from the local cache.

Advantageously, the present invention provides methods and elements that respond to queries for data from network elements by providing the data or by obtaining the data from a foreign network element in an effective and a timely manner. The data is obtained and/or supplied without sacrificing or only minimally affecting the accuracy of the data. The methods and elements of the present invention obtain and/or supply the data in a manner whose particulars as to cost effectiveness, timeliness, and accuracy may be selected by the user or operator. In addition, the manner of obtaining and/or supplying the data is carried out in a dynamic manner based on data already obtained and stored in a local cache.

That the present invention and the exemplary embodiments thereof overcome the problems and drawbacks set forth above and accomplish the objects of the invention set forth herein will become apparent from the detailed description of the exemplary embodiments, which follows.

DETAILED DESCRIPTION

Figure 1:
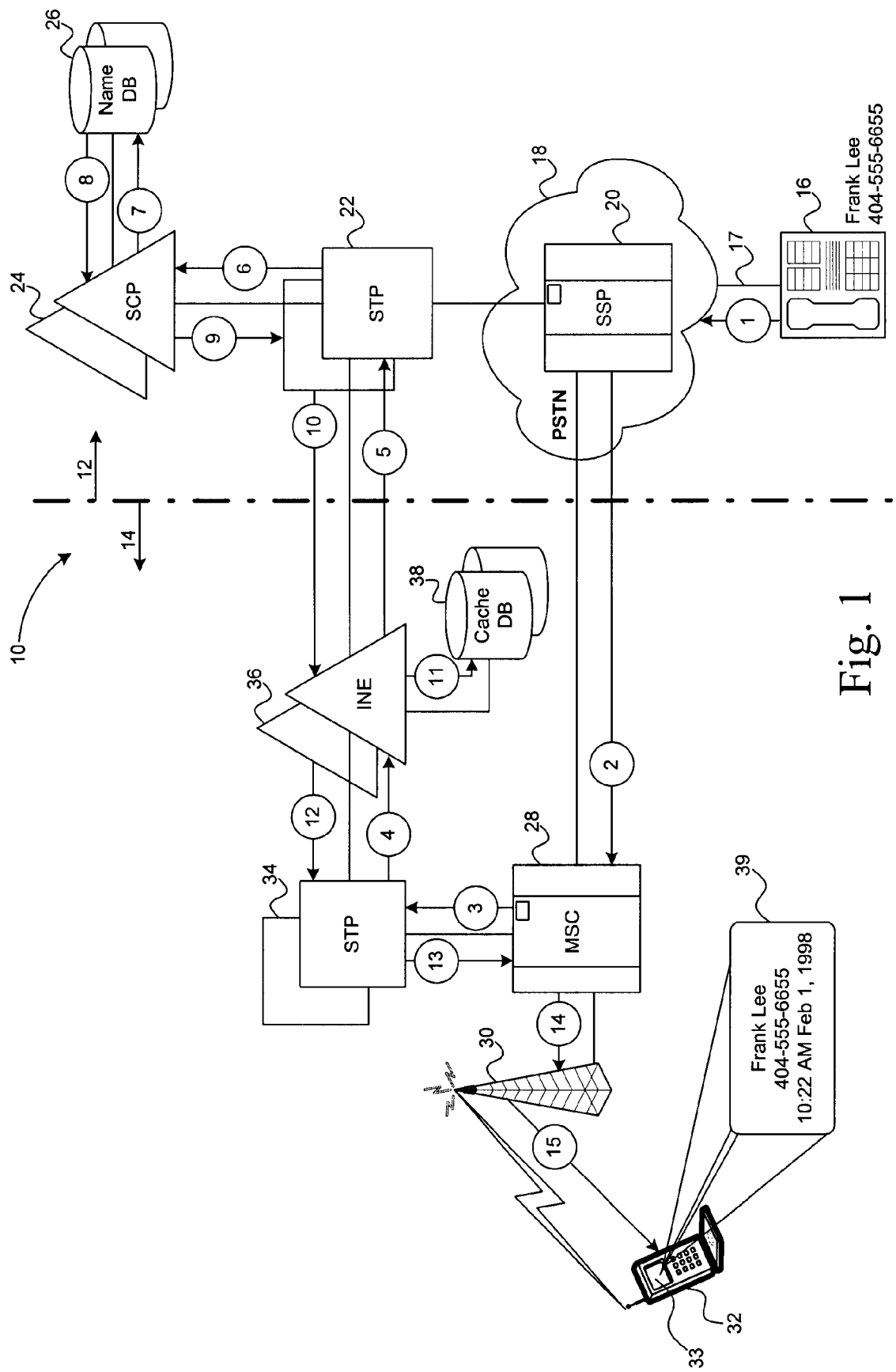
FIG. 1 illustrates an environment for use of an exemplary embodiment of the present invention.

The present invention relates generally to methods and elements that reduce the number of queries from network elements of a particular service provider or system to a network element ("foreign network element") of a different service provider or system. Advantageously, the reduction in the number of queries typically saves time and money at least with respect to network operations of the particular service provider or system.

Generally stated, exemplary embodiments of the present invention intercept queries and responses between the network elements and a foreign network element. As responses from the foreign network element are intercepted, the data from a response is stored so as to build a local cache of retrieved data. In response to the interception of a query, a check is made to determine whether the data sought by the query is stored in the local cache. If the data is stored in the local cache, an integrity check(s) with respect to the data may be carried out. If the integrity check is passed, then the data is returned to the appropriate network element without the query having been transmitted to or the data obtained from the foreign network element. If the integrity check is not passed, if the data is not stored in the local cache, or if a determination is made not to send the data from the local cache, then the data is obtained from the foreign network element. Advantageously, the data obtained from the foreign network element is added or updated to the local cache so that a subsequent query for the same data does not have to be transmitted to the foreign network element. Rather, if the integrity check is passed, typically the data is supplied from the local cache.

The exemplary embodiments are described in the context of a telecommunications system including a wireline network and a wireless network. The exemplary embodiments also are described in the context of network elements making queries for calling name data or information from a foreign network element. But the present invention is not to be limited to these exemplary embodiments. The methods and elements of the present invention may be used in contexts other than network elements seeking calling name data and other than telecommunications. For example, the methods and elements may be used in connection with any other communications networks or systems that exchange messages such as queries and responses so as to exchange information or data. In addition, the methods and elements of the present invention may be used to reduce the number of queries or other messages between or among elements of the same network or system rather than between network elements of a particular network or system and a network element ("foreign network element") of a different network or system. Thus, the use of the term "foreign" is used principally herein to distinguish the network element which generally stores data or information from other network elements which generate the queries seeking the data or information stored in the foreign network element.

A specific example of a use of the methods and elements of the present invention other than the exemplary embodiments described herein may include use in a local number portability (LNP) environment wherein LNP data may be obtained.

Exemplary Environment

FIG. 1 illustrates an exemplary environment in which an exemplary embodiment of the present invention may be used. In particular, FIG. 1 illustrates a telecommunications system 10, and specifically, a wireline network 12 and a wireless network 14. A wireline network also may be referred to as a landline network. Both terms generally refer to a telecommunications system wherein communication units typically are connected by twisted-pair copper wire, cable, or other "lines" to switches that serve the respective units.

The communication unit 16 (also referred to as terminating equipment) is illustrated in FIG. 1 as a telephone used by a person named Frank Lee. Even though the communications unit 16 is illustrated as a telephone, it should not be so limited, and may include other devices such as facsimile machines, computers, modems, and the like. Frank Lee's telephone 16 is connected to one end of a line 17 (also referred to as a subscriber line or calling line). Each active calling line in a wireline network 12 generally is assigned a ten digit directory number. As illustrated in FIG. 1, Frank Lee's directory number (also referred to as telephone number or calling line number) is 404-555-6655. Frank Lee's calling line 17 is connected as well to the public switched telephone network (PSTN) 18, and particularly, to a switch referred to as an SSP 20. A switch may be referred to as a central office, end office, or the like. A switch that may operate pursuant to the Signaling System 7 (SS7) protocols and function in an Advanced Intelligent Network (AIN) is referred to as a service switching point (SSP). Each SSP typically serves a designated group of calling lines, and thus, the SSP or switch that serves a particular calling line may be referred to as its serving switch.

Figure 2:
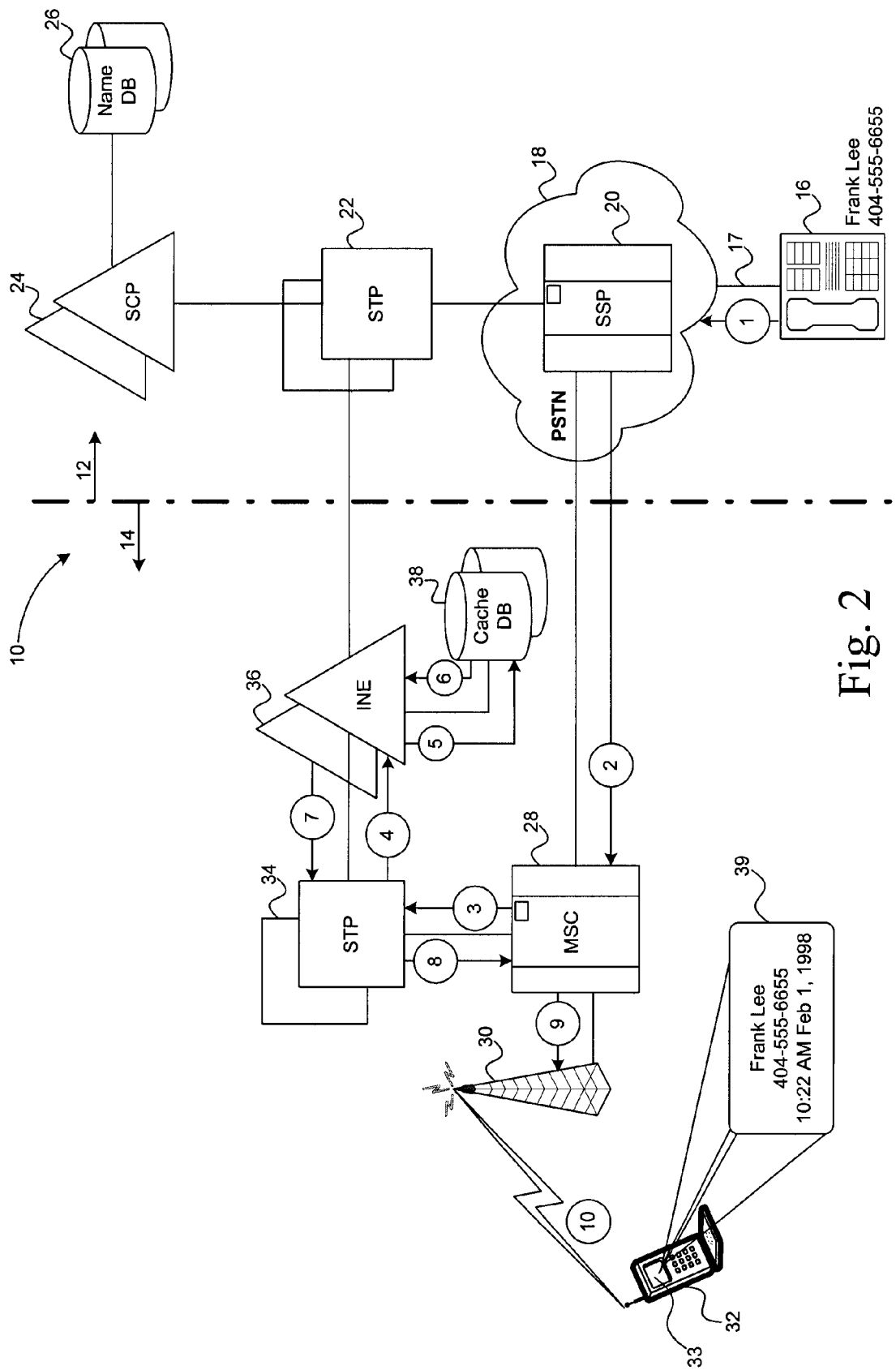
FIG. 2 illustrates additional detail with respect to the environment illustrated in FIG. 1.

In the wireline network 12, the SSP 20 may be connected by a data link, trunk line, or other means to other elements in the wireline network. For example, the SSP 20 is illustrated as connected by a data link to a signal transfer point (STP) 22. Currently, the data links employ the SS7 protocol. The STP 22 as well as other elements in FIGS. 1 and 2 are illustrated and operate typically as redundant pairs, but are referred to herein in the singular. The STP 22 is connected over an SS7 data link to a service control point (SCP) 24.

Among the functions performed by the SCP 24 is the maintenance of network databases and subscriber databases. For example, SCP 24 is illustrated as connected to a name database 26, which also may be referred to as a calling name database. Generally, the name database 26 includes correlative information for all directory numbers served by the service provider associated with a particular wireline system. For example, the name database 26 includes an entry for the subscriber ("Frank Lee") associated with telephone 16, calling line 17, and the directory number associated with the calling line 17. The entry may include the name of the subscriber, the directory number of the subscriber, or other information. Assume the entry for Frank Lee includes his name and directory number (404.555.6655). Typically, the SCP 24 is also the repository of service package applications (SPAs) that are used in connection with or as part of the databases and the SCP 24 in the application of telecommunication services or enhanced features to calling lines.

Referring again to SSP 20, it may be connected to other network elements as well as to the STP 22. Generally, an SSP is connected to other SSPs by a plurality of trunk circuits which are the voice path trunks that interconnect the SSPs to connect communications. The term "communication" or "call" is used herein to include all messages that may be exchanged between a caller and a called party in a telecommunications system. As well as the SSP 20, the other elements of the wireline network 12 may be connected to other network elements (not shown) such as a regional STP, regional SCP, service management system (SMS), as well as others. For additional information regarding the wireline system 12, and in particular, regarding an Advanced Intelligent Network (AIN) operating as a wireline system, the reader is directed to the commonly assigned patent to Weisser, Jr., U.S. Pat. No. 5,430,719, which is incorporated herein by reference.

Elements of the wireline network 12 such as the SSP 20 and the STP 22 may be at least functionally connected to elements in the wireless network 14. Such connections are obviously necessary so as to route communications between the wireline network 12 and the wireless network 14. The exemplary wireless network 14 may be any radio telephony system such as a cellular mobile radiotelephone (CNR) system, personal communication system (PCS), global standard for mobile communications (GSM) system, and other such systems.

FIG. 1 shows SSP 20 (and the PSTN 18) is at least functionally connected to an element of the wireless system 14 referred to as a mobile switching center (MSC) 28 (also referred to as a mobile telephone switching office (MTSO)). The MSC 28 in the wireless system 14 functions very much like a switch or SSP in the wireline network 12 in the routing and connection of calls to a communications unit. FIG. 1 illustrates that MSC 28 is at least functionally connected over wireline (and possibly through a cell site (not shown)) to base station 30. The base station 30 exchanges communications over an air link with a wireless communications unit (WCU) 32, which may be a cellular phone, personal communication service (PCS) unit, a pager, or the like. The WCU 32 is shown as having a display 33 for the display of messages such as the exemplary calling party identification (CallerID) information that is provided pursuant to an exemplary embodiment of the present invention.

Unlike a wireline communications unit such as telephone 16, a WCU 32 is not associated with a particular calling line, and thus, is not associated with a particular calling line number assigned to the calling line. Rather, a WCU 32 is typically assigned a mobile identification number (MIN) that may be used by a caller to reach a person using a WCU. The MIN used to reach a WCU is referred to herein as a mobile number, and also may be referred to as a cell phone number, car phone number, mobile directory number, PCS number, or pager number (if the WCU is a pager), or the like. Like a wireline communications unit such as telephone 16, a WCU 32 may be said to have a "serving switch" because a WCU is assigned an MSC to function as its home switch or home MSC. The MSC assigned as the home switch generally includes a home location register (HLR)(not illustrated), which stores data and information relating to the WCUs served by that MSC. In particular, the HLR may store or have access to information about the telecommunications features and enhanced services that are to be provided to the WCU 32.

Typically, all calls to the mobile number of WCU 32 are routed to its home switch. Assume MSC 28 is the home switch of WCU 32. Also assume the subscriber using the WCU 32 subscribes to the CallerID feature. When the MSC 28 receives a call for the WCU 32, the MSC 28 checks its HLR to determine whether the WCU 32 is entitled to special features or enhanced services. In this example, the MSC 28 finds the subscriber associated with the WCU 32 subscribes to the CallerID feature. Prior to routing the call to the WCU 32, the MSC 28 takes steps to obtain calling name information. In general, the MSC 28 sends a query for the calling name information to a network element that includes a calling name database with the calling name information. The network element including the calling name database is unlikely to be a part of the wireless network 14, and is most likely to be a network element in the wireline network of the service provider serving the calling party. Since the query for the calling line information is routed to a network element outside the wireless network of the wireless service provider, the network element with the calling name database is referred to herein as a "foreign" network element or a "foreign" database. This nomenclature is for ease of reference. The present invention also may be used in an environment wherein network elements of a particular network make queries and receive responses from another network element of the particular network.

In some cases, the WCU 32 may be roaming outside the geographic area served by its home wireless network 14 and be located in some "visited" wireless network. In the visited wireless network, the MSC serving the roaming WCU 32 (often referred to as a "roamer") is referred to as the visited MSC. The visited MSC keeps track of the roamer in a visitors location register (VLR), and may exchange information (such as authentication and validation information)

about the roamer with the home switch of the WCU 32. A caller may call the subscriber associated with the WCU 32 while the subscriber is roaming. The call is routed to the home switch of the WCU 32, which in turn, further routes the call using a temporary line directory number (TLDN) to the visited switch for termination to the WCU 32. The home switch of the WCU 32 also may provide the visited switch with information relating the telecommunications features and enhanced services that are to be provided (if possible) by the visited wireless network to the roamer.

Obtaining Data for the Local Cache—FIG. 1

FIG. 1 includes arrows that track the progress of a call from a calling party ("Frank Lee") to a called party using the WCU 32 wherein the called party subscribes to the CallerID feature, which is implemented through an exemplary embodiment of the present invention. FIG. 1 also includes arrows that track the routing of a query/response exchange from the MSC 28 through an INE (INE) 36 to an SCP 24 for data used in implementing the CallerID feature. As illustrated by arrow 1, Frank Lee uses his telephone 16 to place a call on calling line 17. The call is directed to the mobile number of the WCU 32. The SSP 20 serving the calling line 17 routes the call through the PSTN 18 and as illustrated by arrow 2 to the wireless network 14 including the MSC 28 serving as the home switch to the WCU 32. The MSC 28 checks its HLR, determines the subscriber associated with the WCU 32 subscribes to the CallerID feature, and launches a query for the calling line information.

Per this example, the MSC 28 launches a query for the calling name information wherein the query uses the point code (PC) of the SCP 24 that includes the calling name database 26 as the destination point code (DPC) in the query. As illustrated by arrow 3, the query is first routed to a service transfer point (STP) 34 for further routing on its way to the element corresponding to the destination point code (DPC) in the query. In the prior art, the STP 34 would have routed the query along its way through telecommunications system 10 to reach SCP 24. But, pursuant to an exemplary embodiment and as illustrated by arrow 4, the STP 34 may be configured to route a query to an INE 36. For example, the STP 34 may route the query to the INE 36 when (1) the query seeks calling name information; or (2) the query uses a particular point code (such as the point code of an element having a name database) as the destination point code (DPC).

Alternatively, the MSC 28 may be configured to launch the query for the data such as the calling name information so that the query uses the point code (PC) of the INE 36 as the destination point code (DPC) in the query. As yet another alternative, the STP 34 may include the INE 36 and its cache database 38 (or their functionality), in which case, the STP 34 does not have to further route. the query).

In response to receipt of the query, the INE 36 checks its cache database 38 (also referred to as a "local cache") to determine whether the data (such as the calling name information) sought by the query is stored in the cache database 38. For the example illustrated by the arrows in FIG. 1, assume the data sought by the query is not stored in the cache database 38. FIG. 2 provides an example wherein the data sought by the query is stored in and provided to the MSC 28 from the cache database 38.

FIG. 1 also illustrates the case wherein the cache database 38 may include the data sought by the query, but for some reason, such as the failure of an integrity check(s), the data sought by the query is not provided from the cache database 38 by the INE 36. Rather, the INE 36 takes action to obtain the data (also referred to as the "corresponding data") from the appropriate network element, such as the SCP 24 including the name database 26. The integrity check and other reasons why the INE 36 may obtain the data from another appropriate network element rather than from its cache database 38 are described below in connection with FIG. 3.

Having determined the data requested in the query is not stored in the cache database 38, or otherwise is not to be provided from the cache database 38, then the INE 36 further routes the query to an appropriate network element. The INE 36 may determine where to further route the query in any of the following ways: (1) the INE 36 may route the query to the network element whose point code was used as the destination point code in originally routing the query before the query was intercepted by the INE 36; or (2) the INE 36 may route the query based on a look-up of the point code of the appropriate network element. In the example illustrated in FIG. 1, the query seeks calling name information regarding the calling line 17 associated with telephone 16. The INE 36 routes the query to the wireline network 12, and in particular, as illustrated by arrow 5, to STP 22, which in turn, routes the query, as illustrated by arrow 6, to SCP 24.

In response to receipt of the query, as illustrated by arrows 7 and 8, the SCP 24 obtains the data such as the calling name information (or the corresponding calling name information) from the name database 26. The SCP 24 returns the data such as the calling name information (or the corresponding calling name information) in a response in a reverse path to that taken by the query through the STP 22 to the INE 36 as illustrated by arrows 9 and 10. Upon receipt of the response from the SCP 24, the INE 36 stores the data such as the calling name information in the cache database 38. If the data in the response is corresponding data, then the corresponding data is used to update the data stored in the cache database 38. Once the data is updated by the corresponding data, it is referred to herein as the updated data. As well as storing the data or updating the data in the cache database, a time-to-live (TTL) register may be set with respect to the updated data in the local cache. Additional information regarding the TTL register is provided below in connection with FIG. 3.

It is an advantage of the exemplary embodiments of the present invention that the data in the cache database 38 of the INE 36 grows as the INE 36 is involved in more and more query/response exchanges. Initially, the cache database 38 may be empty (or nearly empty), but it fills with data that is obtained from the responses that are returned from the network elements that are consulted for such data. It is another advantage that the cache database 38 generally fills only with the data that is obtained through the query/response exchanges that the INE 36 intercepts. The data that is obtained as a result of such interceptions is likely to be the most relevant and most useful data with respect to the subscribers served by the wireless network provider or system using the exemplary embodiments of the present invention. The cache database 38 is not filled with data that may be superfluous or unusable, but rather, is filled with data that is obtained through real-time usage and service provided to subscribers. Thus, the space in the cache database 38 is used efficiently for storage of data that has been proved useful to serving subscribers.

After storing the data or updating the data in the cache database, the INE 36 routes a response including the data or the updated data through STP 34 to the MSC 28 (arrows 12 and 13). In response to receipt of the response, the MSC 28 transmits the data or the updated data along with the call through base station 30 to WCU 32 (arrows 14 and 15). The WCU 32 uses the data or the updated data to display the calling name information to the subscriber or other user of the WCU 32. Advantageously, in this example, the subscriber is provided with the call and with information 39 including the caller's name, calling line number, and time and date of the call that is displayed on the display 33 of the WCU 32 for ready reference by the subscriber.

As noted above in the explanation of the exemplary environment, in some cases, the WCU 32 may be roaming when a call is placed to the unit. In the case of a roaming WCU 32 subscribing to the CallerID feature, the exemplary embodiment functions generally in the manner described above because all calls to a wireless unit typically are routed to its home MSC—even when the wireless unit is roaming. Thus, pursuant to an exemplary embodiment of the present invention, in response to receipt by a home MSC of a call for a wireless unit that is roaming, the home MSC and the INE (INE) may execute the actions described above prior to the call (and any obtained data) being further routed to the visited system where the roamer is roaming.

Responding to a Query with Data from the Local Cache—FIG. 2

FIG. 2 like FIG. 1 includes arrows that track the progress of a call from a calling party ("Frank Lee") to a called party using the WCU 32 wherein the called party subscribes to the CallerID feature, which is implemented through an exemplary embodiment of the present invention. FIG. 2 unlike FIG. 1 does not include arrows to or from a foreign network element because the data sought by the query from a network element is not obtained from the foreign network element. Rather, the data is obtained from the INE 36 as described below.

In the example illustrated in FIG. 2, assume Frank Lee uses his telephone 16 to place a second call on calling line 17 to the mobile number of the WCU 32. This second call, like the first call described in connection with FIG. 1, is routed from calling line 17 to the SSP 20 (arrow 1) and through the PSTN 18 to the MSC 28 serving WCU 32 (arrow 2). As with the first call, the MSC 28 checks its HLR, determines the subscriber associated with the WCU 32 subscribes to the CallerID feature, and launches a query for the calling line information which is routed through STP 34 (arrow 3) to the INE 36 (arrow 4).

In response to receipt of the query, the INE 36 checks its cache database 38 and finds the data sought by the query (the calling name information) is stored in the cache database 38. The INE 36 may conduct an integrity check(s) with respect to this data. If the data does not pass the integrity check(s) (or for other reasons), the INE 36 takes action to obtain the data (referred to as the corresponding data) from the appropriate network element, such as the SCP 24 including the name database 26. The integrity check(s) and other reasons why the INE 36 may obtain the data from another appropriate network element rather than from its cache database 38 are described below in connection with FIG. 3.

Having determined the data requested in the query is stored in the cache database 38, the INE 36 obtains the data from the cache database 38 (arrows 5 and 6). The INE 36 then routes a response including the data obtained from the cache database 38 through STP 34 to the MSC 28 (arrows 7 and 8). In response to receipt of the response, the MSC 28 transmits the data along with the call through base station 30 to WCU 32 (arrows 9 and 10). The WCU 32 uses the data to display the calling name information to the subscriber or other user of the WCU 32.

Advantageously, the exemplary embodiment of FIG. 2 obtains the information sought by the MSC 28 with respect to serving the subscriber without having to consult a foreign network element. By not having to consult with the foreign network element, such as the SCP 24 including the name database, the exemplary embodiment saves time and money. In particular, the exemplary embodiment saves time because the data may be obtained and provided to the subscriber in fewer steps. The exemplary embodiment saves money because the foreign network element is not consulted for the data, and thus, does not earn a fee for the data.

Figure 3:
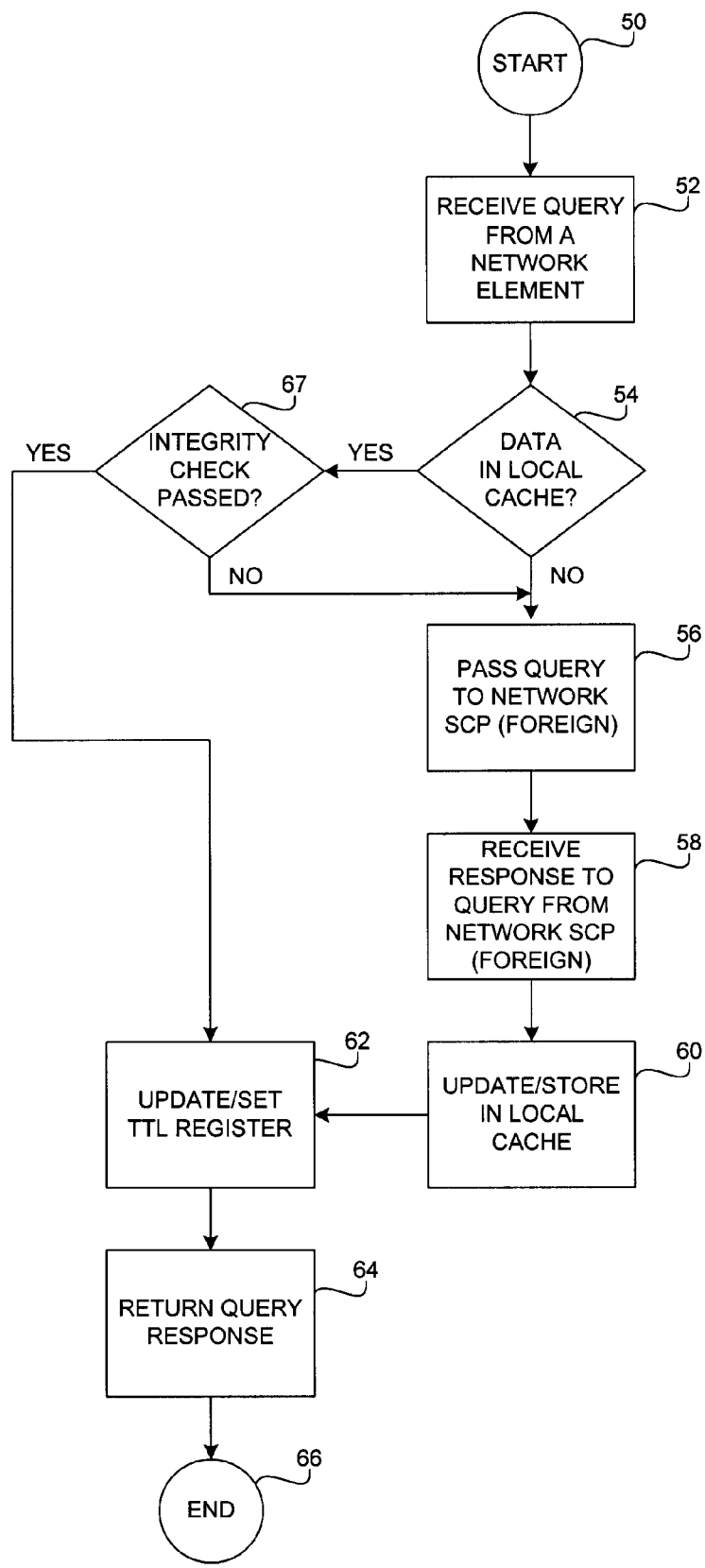
FIG. 3 is a flow diagram illustrating an exemplary embodiment of the present invention.

Exemplary Method—FIG. 3

FIG. 3 illustrates an exemplary method of the present invention that may be carried out to determine whether the response to a query is to include data from the cache database 38 or is to be obtained from an appropriate network element such as a foreign network element (also referred to as "network SCP"). After start 50, a query is received from a network element (block 52). In response to the receipt of the query, a determination is made as to whether the data sought by the query is stored in the local cache (block 54).

No Branch of Block 54. If the determination in block 54 is that the data is not stored in the local cache, then the data is obtained from the appropriate place. In particular, the query may be further transmitted to a foreign network element such as a network SCP (block 56). In response to the query, a response is received from the foreign network element and the response generally includes the data sought by the query (or other information such as the unavailability of the data, etc.) (block 58). The data obtained from the foreign network element is stored in the local cache (block 60). (In the case that corresponding data has been obtained, then the data in the local cache is updated with the corresponding data and then is referred to as updated data.)

Exemplary embodiments of the present invention include advantageous features to make sure there is a high probability that the data stored in the local cache is substantially the same as the corresponding data in the foreign network element. One of these features is referred to herein as a time-to-live (TTL) register. The TTL register is used to set a time period with respect to the data stored in the local cache. The time period may begin to run from storage of the data in the local cache. Upon expiration of the time, the data is no longer considered as accurate as desired, and is considered to be suspect. The data may be suspect because the corresponding data in the foreign network element may have been changed during the time period. Advantageously, the user or operator may choose the time period to be set in the TTL register with respect to the data, and may choose different time periods for each entry of data. Therefore, the user or operator may choose its own desired probability of accuracy with respect to any set of data stored in the local cache. In addition, the user or operator may set the exemplary embodiment to automatically refresh or update any data whose TTL has expired. In other words, no checking or monitoring of the TTL register for updates of data need be initiated and/or maintained by the user or operator.

Referring again to FIG. 3, after block 60 wherein the data (or corresponding data) obtained from the foreign network element has been stored or updated in the local cache, then an exemplary embodiment of the present invention takes advantage of the TTL register by setting or updating it with respect to the retrieved data (block 62). The data then is provided in a response to the query initiated by the network element (block 64), and the exemplary method ends (block 66).

Yes Branch of Block 54. As noted above, in block 54, a determination is made as to whether the data sought by the query is stored in the local cache. If the data is stored in the local cache, then the data may be provided in a response to the query. But exemplary embodiments of the present invention include an advantageous feature referred to herein as an integrity check(s) (block 67) to raise the probability the data in the local cache is substantially the same as the corresponding data in the foreign or appropriate network element. The integrity check(s) may include more than one type of checking or determination, but is referred to in the singular in block 67, FIG. 3 for brevity. Exemplary integrity checks are discussed below in connection with FIG. 4.

No Branch of Block 67. If the determination in block 67 is that the data has not passed the integrity check, then the corresponding data is obtained from the appropriate place. The data sought by the query is obtained from the foreign network element as if the local cache did not store the data. See blocks 56, 58, 60, 62, 64, and 66 of FIG. 3, described above.

Yes Branch of Block 67. If the determination in block 67 is that the data has passed the integrity check, then the data may be provided in a response to the query. But exemplary embodiments of the present invention include the advantageous feature previously referred to herein as the time-to-live (TTL) register. Among the reasons that the TTL register has been added as a feature to exemplary embodiments is that the inventors have found that data that passes an integrity check (whether the data passes a plurality of integrity checks or a particular type of integrity check) has a relatively high probability of being substantially the same as the corresponding data stored in the foreign network element. Because of this finding, the inventors have added the TTL register whereby the time-to-live of the data that passed the integrity check(s) is extended beyond its original TTL setting. Advantageously, the user or operator may select how long to extend the TL setting, and may make such selection on a per data basis. Thus, with respect to data that passes the integrity check (block 67), the TTL register is updated pursuant to the user or operator's choice of extension time. The data then is provided in a response to the query initiated by the network element (block 64), and the exemplary method ends (block 66).

Figure 4:
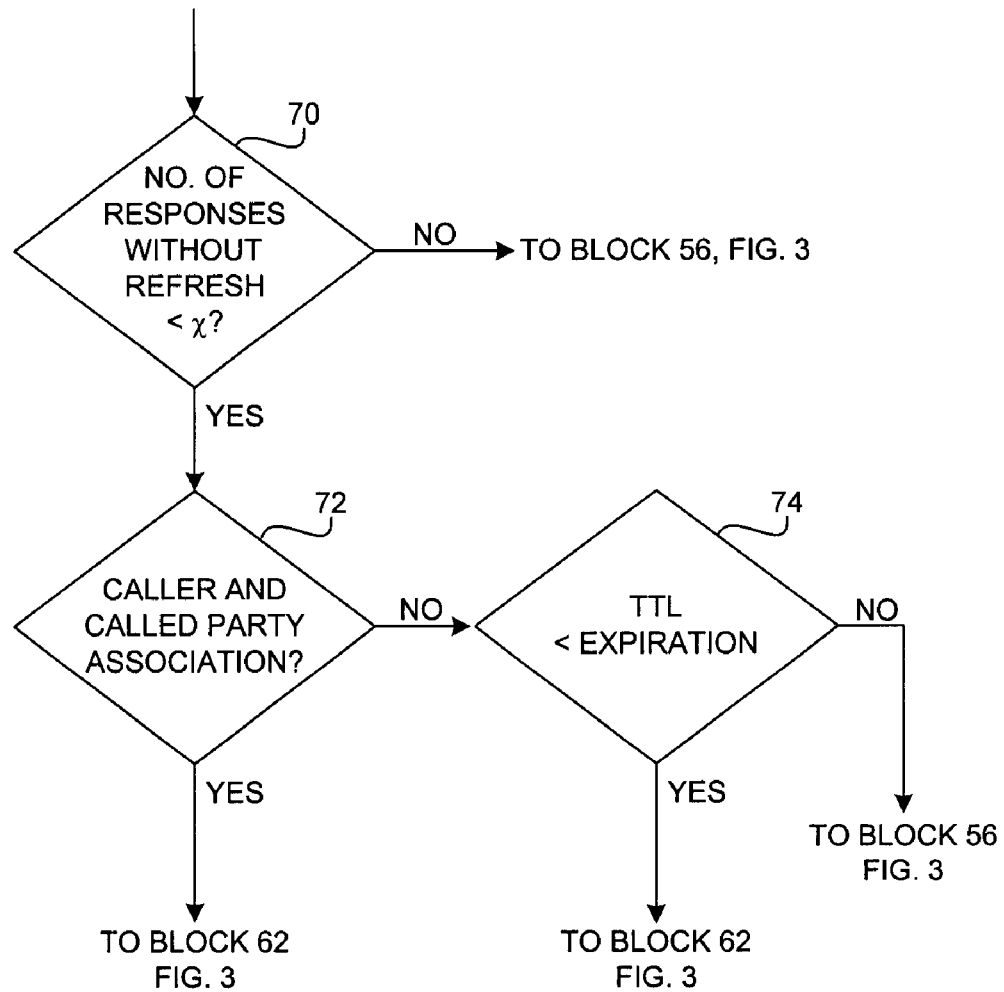
FIG. 4 is a flow diagram illustrating additional details of the flow diagram of FIG. 3.

Integrity Check(s)—FIG. 4

Greater detail is now presented with respect to the integrity check(s) that may be carried out with respect to data found to be stored in the local cache in response to receipt of a query from a network element (block 67 in FIG. 3). The integrity check(s) serve to assure the user or operator of the probability the data in the local cache is substantially the same as the corresponding data in the foreign network element. Advantageously, the user or operator may choose the desired probability level, and may implement as many or as few (none if desired) integrity checks as appropriate to achieve the desired level.

An advantage of the exemplary embodiments is that a user or operator may choose to implement all of the integrity checks, a combination of fewer than all of the checks, or only one of the checks. Moreover, the user or operator may choose to implement one or various combinations of checks at different stages in the development of the local cache. For example, fewer integrity checks may be implemented when the local cache of data is small versus when the local cache of data is large, or vice-versa. In addition, a user or operator may choose to implement a different number or different combination of integrity checks depending on the load on the INE. For example, a user may choose to implement more integrity checks or checks that are more difficult to meet when the exemplary embodiment is busy with a lot of queries from network elements. Alternatively, the receipt of a lot of queries may cause the user or operator to decide to implement fewer integrity checks or integrity checks that are easier to meet. Advantageously, the exemplary embodiments provide features such as the integrity checks that may be selectively implemented to suit the particular needs of a user or operator.

FIG. 4 illustrates an exemplary implementation of three integrity checks as the integrity check of block 67: (1) the refresh feature (block 70); (2) the association feature (block 72); and (3) the time-to-live (TTL) register (block 74). This is only an exemplary implementation, and those skilled in the art may implement these three checks in a different order, or may implement fewer or more than these or other checks as the integrity check of block 67.

Number of Responses Without Refresh

In the exemplary embodiment of FIGS. 3 and 4, after a determination is made in block 54, FIG. 3, that the data sought by a query from a network element is stored in the local cache, then the refresh feature (block 70) is carried out with respect to the data. The refresh feature allows the user or operator to maintain the desired level of probability that the data stored in the local cache is substantially the same as the corresponding data in the foreign network element. The refresh feature allows the user to maintain the desired level by allowing the user to control the timing of the updates to the data stored in the local cache. The user is allowed to control the timing by selecting the number of responses that include the data that may be returned to network elements in responses to queries before the data in the local cache is refreshed. This number is referred to herein as the number of responses without refresh. For example, the user may set the number of responses without refresh at ten. Once ten responses including the data have been returned to network elements, the data in the local cache is considered to be suspect. The data may be updated by obtaining the corresponding data from the foreign network element and refreshing the data with the corresponding data. This updating may occur automatically or may be implemented through a monitoring process carried out by the user.

Advantageously, the refresh feature allows a user to select how often to retrieve the data sought by a query from the local cache rather than obtain the corresponding data from the foreign network element. The refresh feature provides the user with flexibility in operating the exemplary embodiments. If the user chooses to set the number of responses without refresh as a low number, then the corresponding data is retrieved more often from the foreign network element. More often retrieval from the foreign network element generally means higher fees paid to the foreign service provider. On the other hand, more often retrieval from the foreign network element also typically provides a higher level of probability the data in the local cache is substantially the same as the corresponding data in the foreign network element.

If the user chooses to set the number of responses without refresh as a high number, then the corresponding data is retrieved less often. Less often retrieval from the foreign network element generally means lower fees paid to the foreign service provider. But on the other hand, less often retrieval from the foreign network element also typically provides a lower level of probability the data in the local cache is substantially the same as the corresponding data in the foreign network element. The user is allowed to choose the number of responses without refresh that leads to the level of probability and/or cost of retrieval appropriate for the user's situation.

Referring to FIG. 4, the refresh feature (block 70) is implemented in the exemplary embodiment by checking whether the number of responses including the data that have been provided to network elements without refresh fall within (are less than) the number selected by the user. If the number of responses without refresh that have been provided are greater than or equal to the number set by the user, then the data in the local cache is considered suspect. The exemplary embodiments provide that the corresponding data be obtained from the foreign network element. See block 56 et seq., FIG. 3. If the number of responses without refresh that have been provided are less than the number set by the user, then the exemplary embodiment proceeds with the next integrity check, which is referred to as the association feature (block 72).

The exemplary embodiments also include a feature whereby the number of responses without refresh for any particular set of data may be changed dynamically by the exemplary embodiment without initiation or monitoring by the user or operator. In other words, the exemplary embodiments may be said to be "self-learning".

For example, assume the number of responses without refresh is set at a low number such as "2" for a particular set of data. Such a low setting directs the exemplary embodiment to obtain the data from the foreign network element rather than the local cache every other time the data is sought by a query. Such a low setting does not express much confidence in the data in the local cache remaining for any great length of time substantially the same as the corresponding data in the foreign network element. The self-learning feature of the exemplary embodiment notes such facts as that the data retrieved every other time from the foreign network element is the same as the data stored in the local cache for a given number of times the data has been retrieved from the foreign network element. Simply said, the exemplary embodiment notes the data has not changed over the course of a number of retrievals from the foreign network element. The low confidence in the data remaining the same may not have been justified. In that case, the exemplary embodiment may dynamically raise the number of responses without refresh from "2" to some number greater than "2" like "4".

After changing the number of response without refresh, the exemplary embodiment may continue to monitor the retrieval of the corresponding data and its similarity (or lack thereof) to the data stored in the local cache. If the data continues to remain the same, the exemplary embodiment again may raise the number of responses without refresh from "4" to "5". Each higher number expresses a greater level of confidence that the data in the local cache will remain substantially the same over a given length of time as the corresponding data in the foreign network element. On the other hand, if the data changes each time it is refreshed, then the data is not entitled to a high degree of confidence. The exemplary embodiment may lower the number of responses without refresh to increase the probability the data in the local cache is the substantially the same as the corresponding data in the foreign network element.

Association Feature

The association feature (block 72) provides the user with a way to determine whether data sought by a query and stored in the local cache has a relative probability of substantially matching the corresponding data in the foreign network element. The inventors have discovered that if there is some relationship between a new query for data and a previous query for the same data, then that data in the local cache is more likely to be substantially the same as the corresponding data in the foreign network element. Thus, the association feature provides the user with a way to check for the relationship between the new query for the data and a previous query for the same data.

The association feature is preferably implemented in the course of building the data in the local cache during the query/response exchanges that are intercepted by the INE. With respect to a query for data, a query parameter of the query is stored in association with the data sought by the query. For example, assume a query includes as a query parameter the mobile number (MIN) of the called party. Also assume the query seeks as data the CallerID information associated with the caller, i.e., the caller's name. The association feature provides that the INE store the query parameter (the MIN) in association with or to note the association with the data sought by the query (the caller's name). In the exemplary embodiment, for each query/response exchange, the INE stores the mobile number of the called party in association with the caller's name. Table 1 below illustrates exemplary associations between a query parameter and the data sought by the query. Of course, an application other than a CallerID feature may include different subject matter for the associations.

TABLE 1

Associations Between A Query Parameter and Data Sought by the Query

| Query Parameter* | Data Sought by the Query |
|---|---|
| MIN of Called Party* | CallerID information (Caller's name) |

The association feature (block 72) is further implemented in the exemplary embodiment by a determination that is carried out with respect to each new query that is received. The determination is based on the finding in check block 54, FIG. 3 that the data sought by the new query is stored in the local cache. For example, for CallerID information, the new query may include the calling line number associated with the call in a query parameter. The exemplary embodiment has found the CallerID information in the local cache for that calling line number.

In the association feature, the determination then is made as to whether the new query includes a new query parameter that matches a query parameter that may have been stored in association with the data sought by the new query. For example, the new query may include the mobile number (MIN) of the called party as a new query parameter. The data in the local cache, the CallerID information, may have been stored in association with one or more query parameters during the course of previous query/response exchanges. The CallerID information may have been stored in association with the MIN of the called party as the result of a previous call from the caller to the called party. In that case, a determination is made that the MIN of the new query matches a MIN stored in association with the CallerID information in the local cache.

As a result of the determination that a match exists between the new query parameter and a previous query parameter, the data in the local cache is considered to be more likely to be substantially the same as the corresponding data in the foreign network element. The finding of the match also may be referred to as the finding of an association between the caller and the called party. The exemplary embodiment then may proceed with updating the TTL register and the remaining actions described above in connection with blocks 62 et seq., FIG. 3. In particular, after a finding of an association between the caller and the called party (block 72), the exemplary embodiment updates the TTL register so as to extend the time the data is considered to be more likely to be at least substantially the same as the corresponding data in the foreign network element. Advantageously, the user may select the amount of time the TTL register for the data is extended.

If no match is found between the respective new query parameter and a previous query parameter, then the data in the local cache is considered suspect. In the exemplary embodiment, if no match is found in block 72, then the exemplary embodiment proceeds with the next integrity check, which is referred to as the TTL register feature (block 74).

Time-to-Live (TTL) Register Feature

The TTL register feature (block 74) provides the user with a way to determine whether data sought by a query and stored in the local cache has a relative probability of substantially matching the corresponding data in the foreign network element. A TTL register is used to set a time period with respect to the data stored in the local cache. The time period may begin to run from storage or update of the data in the local cache. Upon expiration of the time, the data is no longer considered as accurate as desired by the user, and thus, is considered to be suspect. Advantageously, the user or operator may choose the time period to be set in the TTL register with respect to the data, and may choose different time periods for each entry of data. Therefore, the user or operator may choose its own desired level of probable accuracy with respect to any set of data stored in the local cache. In addition, the user or operator may set the exemplary embodiment to automatically refresh or update any data whose TTL has expired. In other words, no checking or monitoring of the TTL register for updates of data need be maintained by the user or operator.

The TTL register feature is implemented in the course of building the data in the local cache during the query/response exchanges that are intercepted by the INE. When a response including data is obtained from the foreign network element for further routing to the network element that initiated the query for the data, the data is stored in the local cache. If the response includes corresponding data, then the corresponding data is used to update or refresh the data in the local cache, which then is referred to as updated data. As noted above in connection with block 60, FIG. 3, a TTL register is set with respect to the data or the updated data.

The TTL register feature is further implemented by a check of whether the TTL register as to the data sought by the query and stored in the local cache has expired. If the TTL has expired (TTL=or>expiration), then the data in the local cache is considered suspect. The exemplary embodiments provide that the corresponding data be obtained from the foreign network element. See block 56 et seq., FIG. 3. If the TTL has not expired, then the data is considered to have a relative probability of being substantially the same as the corresponding data in the foreign network element. The exemplary embodiment then proceeds with updating the TTL register and the remaining actions described above in connection with blocks 62 et seq., FIG. 3. In particular, after a finding the TTL has not expired (block 74), the exemplary embodiment updates the TTL register so as to extend the time the data is considered to be more likely to be at least substantially the same as the corresponding data in the foreign network element. The user may select the amount of time the TTL register for the data is extended.

Advantageously, the TTL register feature may be used by exemplary embodiments, even without a query from a network element, to maintain a relative probability that the data in the local cache is substantially the same as the data in the corresponding foreign element. The exemplary embodiment may periodically use the TTL register feature to check whether the TTL of any entries of data stored in the local cache has expired. If so, the exemplary embodiment may take steps to obtain data corresponding to that stored in the local cache from the foreign or other appropriate element. The corresponding data is used to update or "refresh" the data stored in the local cache. Another exemplary embodiment provides that the corresponding data may be obtained to refresh the data in the local cache automatically upon the expiration of the TTL with respect to the data and without the need for initiation, monitoring, or other checking by the operator or the user.

By these periodic updates, the data stored in the local cache is more likely to be substantially the same as the corresponding data stored in the foreign or other appropriate network element. Another advantage of the exemplary embodiments is the time period (i.e., the TTL) may be selected by the operator or user of the exemplary embodiments, and that such selection may be made with respect to each entry of data in the local cache. In other words, the user may select a first entry of data in the local cache to have a TTL of 24 hours, and may select a second entry of data in the local cache to have a different TTL such as 48 hours. Of course, the user or operator may have all of the entries in the local cache updated or refreshed periodically and/or at the same time.

It is not always necessary that all these exemplary integrity checks be carried out, or that they be carried out in the illustrated or any particular order. Further, other integrity checks may be used or used in connection with one or more of the described exemplary integrity checks.

Figure 5:
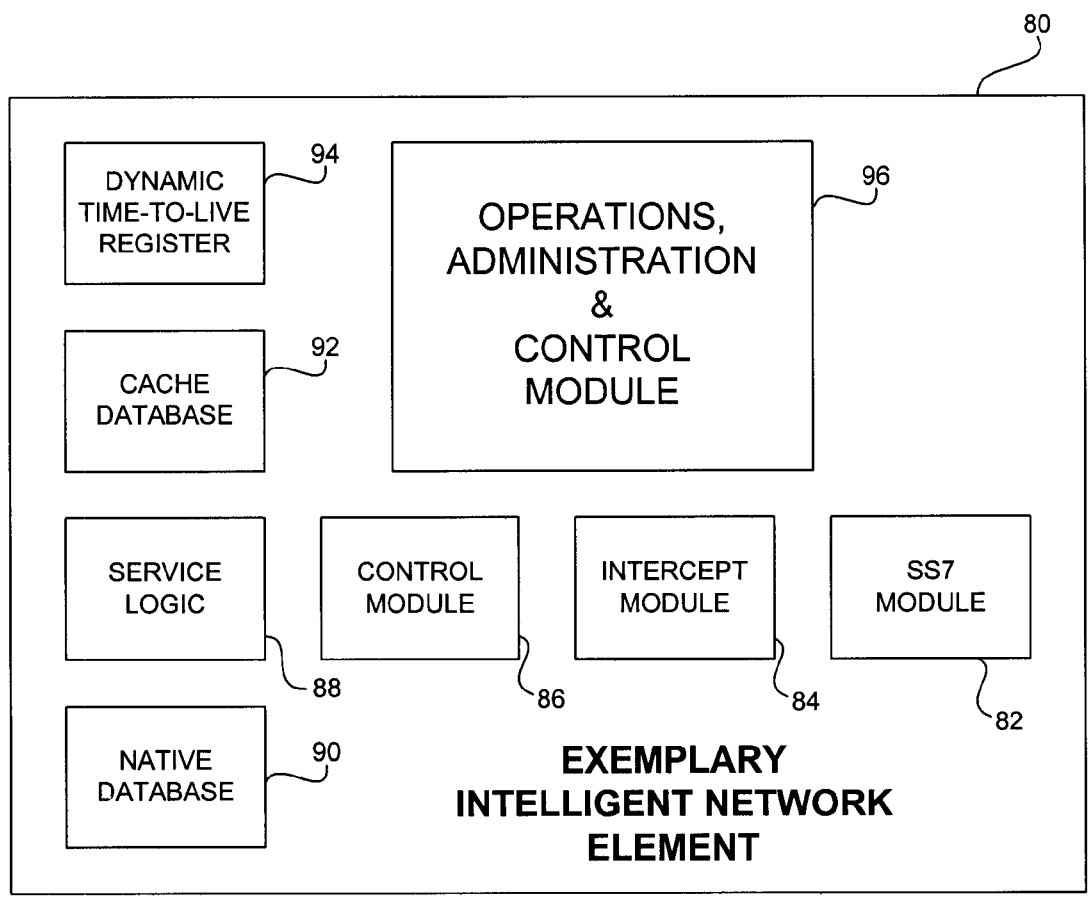
FIG. 5 is a block diagram illustrating an exemplary embodiment of the present invention.

Block Diagram of an Exemplary Intelligent Network Element—FIG. 5

FIG. 5 is block diagram illustrating an exemplary intelligent network element (INE) 80 such as may be used with exemplary embodiments of the present invention. As illustrated in FIGS. 1, 2, and 5, the INE may be a stand-alone device and used in a telecommunications system as or as part of a service control point, service circuit node, signed transfer point (STP), service node, or the like. In a data communications environment, the INE may be implemented in a computer, a switch, a router, or the line. But the INE should not be limited to embodiment in a single device or single type of system. The INE, components, or functions thereof may be incorporated in or executed by one or more other devices, and intra, between, and among systems.

The exemplary INE 80 of FIG. 5 includes eight modules that may generally interact to implement the exemplary embodiments. These modules include: SS7 module 82; intercept module 84; control module 86; service logic 88; native database 90; cache database 92; dynamic time-to-live (TTL) register; and the operations administration and control 96. Further, the eight modules reflect functionality rather than implementation. Thus, the same functionality may be implemented with fewer or more and/or different modules as appropriate.

This exemplary INE 80 may be deployed in a telecommunications system using the signaling system 7 (SS7) protocol. The SS7 module 82 of the INE 80 supports the SS7 protocol running on the INE 80. The main function of the SS7 module 82 is to process queries and responses that are intercepted between network elements and a foreign network element. The SS7 module 82 is mated to the intercept module 84. Of course, if the exemplary embodiment is not deployed in a system that uses the SS7 protocol, then some other appropriate interface module may be used.

The intercept module 84 analyzes received queries and decides whether a query is addressed to a network element that is part of the system operated by a service carrier running the INE 80. In other words, the intercept module 84 determines whether the query is directed to the "local" system, network, or carrier, or whether the query is directed to another, "non-local" or "foreign" system, network, or carrier. A query that is directed to another system, network, or carrier is routed to the control module 86 with an indicator set to distinguish the non-local query from local queries. The intercept module 84 also analyzes received responses such as a response from a foreign network element so that any data in the response may be stored in or used to update the cache database 92.

The control module 86 as its name implies controls the functions of the INE 80. The control module 86 receives queries and responses from the intercept module 84 and routes the queries and responses to the service logic 88.

The service logic 88 treats a local query differently from a non-local query. For example, a local query may seek CallerID information relating to a subscriber of the local carrier. In that case, the service logic 88 uses the calling party number parameter in the local query as the key to searching for a corresponding name in the native database 90. If the name is found, it is retrieved, and the service logic 88 fashions a response including the name to be routed through the SS7 module 82 to the network element that initiated the query.

As another example, a non-local query also may seek CallerID information, but the information sought relates to a subscriber of a non-local carrier. In that case, the service logic 88 uses the calling party number parameter in the non-local query as the key to searching for a corresponding name in the cache database 92 (also referred to as "local cache"). If the name is found, then the service logic 88 may implement integrity check(s) with respect to the data relating to the name. For example, the service logic 88 may check whether the number of responses without refresh have been exceeded (see block 70, FIG. 3), whether the caller and the called party have an association (see block 72, FIG. 3), and/or whether the TTL of the data has expired (see block 74, FIG. 3). If the data passes the integrity check(s), then the data is routed through the SS7 module 82 to the network element that initiated the query. If the data does not pass the integrity check(s), or if the data is not stored in the cache database 92, then the service logic 88 may repackage the query and route it through the SS7 module 82 to the foreign network element so as to obtain the data.

The service logic 88 also receives responses that are intercepted via the intercept module 84 as the response is routed from a foreign network element. The response, and in particular, the data in the response, may be used by the service logic 88 in several ways. The data from the response may be stored in the cache database 92 if the data is not already stored in the cache database 92. The service logic 88 sets a TTL register with respect to the data. If the data is already stored in the cache database 92, then the data from the response may be used to update the data in the cache database 92. The service logic 99 also sets or resets a TTL register with respect to the updated data. In addition, the service logic 88 in storing the data or updating the data may effect the storage of any association between a query parameter and the data sought by the query. For example, the service logic 88 may cause the called party number (such as MIN) to be stored in association with the name of the calling party who has called the called party. As noted above, this association may be used as an integrity check with respect to data stored in the cache database 92.

The native database 90 stores information pertaining to the local system, network, or carrier and subscribers thereof. The native database 90 typically is updated by the customer service organization of the local system, network, or carrier.

The cache database 92 stores the data that is retrieved in responses from foreign network elements. The data may be stored so as to include associations. For example, the called party number of a local subscriber may be stored in association with the names of all of the people who have called him or her by using that called party number.

The dynamic time-to-live (DTTL) register 94 may be used to implement the TTL register feature described above in connection with block 74, FIG. 3, as an integrity check with respect to data stored in the local cache. Preferably, the DTTL register 94 is a statistical engine that calculates a time for expiration of each set of data in the cache database 92. The times may vary. Each expiration time reflects the level of confidence in the associated data stored in the cache database 92 being substantially the same as the corresponding data in the foreign network element. For example, a short expiration time reflects a low level of confidence, and a long time until expiration reflects a higher level of confidence.

The operations, administration, & control module 96 handles the operations, administration, and maintenance (OA&M) functions associated with the INE 80.

Conclusion

In sum, the exemplary embodiments of the present invention reduce the number of queries from network elements to a foreign network element. To effect this reduction, the queries/responses between the network elements and the foreign network element are intercepted. The data from the responses is used to build a local cache of the data or to update the data already stored in the local cache. When a query for data is received from a network element, the data is obtained from the local cache rather than the foreign network element. Integrity checks may be implemented so that the data in the local cache has a high probability of being substantially the same as the corresponding data in the foreign network element.

Advantageously, the present invention provides methods and elements that respond to queries for data from network elements by providing the data or by obtaining the data from a foreign network element in an effective and a timely manner. The data is obtained and/or supplied without sacrificing or only minimally affecting the accuracy of the data. The methods and elements of the present invention obtain and/or supply the data in a manner whose particulars as to cost effectiveness, timeliness, and accuracy may be selected by the user or operator. In addition, the manner of obtaining and/or supplying the data is carried out in a dynamic manner based on data already obtained and stored in a local cache.

From the foregoing description of the exemplary embodiments of the present invention and operation thereof, other embodiments will suggest themselves to those skilled in the art. Therefore, the scope of the present invention is to be limited only by the claims below and equivalents thereof.

We claim:

1. In a system wherein network elements make a number of queries of a foreign network element, a method to build a local cache of retrieved data for use in responding to the network elements so as to reduce the number of queries to the foreign network element by the network elements, the method comprising:

A. receiving from a network element a query for data stored in the foreign network element;

B. determining the data is not stored in a local cache;

C. obtaining the data from the foreign network element;

D. storing the data in the local cache;

E. setting a time-to-live (TTL) register with respect to the data in the local cache; and F. transmitting a response to the network element wherein the response comprises the data obtained from the foreign network element.

2. The method of claim 1, wherein the data comprises calling name information.

3. In a system wherein network elements make a number of queries of a foreign network element, a method to reduce the number of queries from the network elements to the foreign network element, the method comprising:
  A. providing a local cache for data;
  B. in response to a query for the data, checking the local cache for the data;
  C. in response to finding the data in the local cache, then supplying the data from the local cache in response to the query; and
  D. in response to failing to find the data in the local cache, obtaining the data from the foreign network element, storing the data obtained from the foreign network element in the local cache, setting a time-to-live (TTL) register with respect to the data in the local cache, and transmitting a response to the query wherein the response comprises the data obtained from the foreign network element.

4. The method of claim 3, wherein the data comprises calling name information.

5. In a system wherein queries from network elements made to a foreign network element are sought to be reduced by storage of data obtained from the foreign network element in a local cache, a method to increase probability the data in the local cache matches corresponding data in the foreign network element, the method comprising:
  A. receiving from a network element a query for data stored in the foreign network element;
  B. determining the data is stored in the local cache;
  C. despite the data being stored in the local cache, determining to obtain the corresponding data from the foreign network element;
  D. obtaining the corresponding data from the foreign network element;
  E. updating the data stored in the local cache with the corresponding data from the foreign network element so as to store updated data in the local cache;
  F. setting a time-to-live (TTL) register with respect to the updated data in the local cache; and
  G. transmitting a response to the network element wherein the response comprises the updated data.

6. The method of claim 5, wherein the data comprises calling name information; wherein the corresponding data comprises corresponding calling name information; and wherein the updated data comprises updated calling name information.

7. The method of claim 5, further comprising:
  prior to receiving the query from the network element, setting a number of responses comprising the data that are provided to the network elements from the local cache without a refresh of the data; and
  wherein action C comprises determining to obtain the corresponding data from the foreign network element based on the number of responses being exceeded.

8. The method of claim 5, further comprising:
  prior to receiving the query for the data from the network element, causing previously retrieved data retrieved from the foreign network element in response to a previous query to be stored in the local cache so that a previous query parameter of the previous query is stored in association with the previously retrieved data;
  wherein action B comprises determining the data is stored in the local cache as the previously retrieved data; and
  wherein action C comprises determining to obtain the corresponding data from the foreign network element instead of transmitting the previously retrieved data in response to the query based on a failure of a query parameter of the query to match the previous query parameter.

9. The method of claim 5, wherein the data comprises calling name information; wherein the corresponding data comprises corresponding calling name data;
  wherein the method further comprising prior to receiving the query from the network element, causing previously retrieved calling name data, retrieved from the foreign network element in response to a previous query, to be stored in the local cache so that previous called party data of the previous query is stored in association with the previously retrieved calling name data; and
  wherein action C comprises determining to obtain the corresponding calling name data from the foreign network element instead of transmitting the previously retrieved calling name data in response to the query based on a failure of called party data of the query to match the previous called party parameter of the previous query.

10. The method of claim 5, further comprising:
  prior to receiving the query from the network element, setting a time-to-live (TTL) register with respect to the data in the local cache; and
  wherein action C comprises determining to obtain the corresponding data from the foreign network element based on a determination the TTL register is expired.

11. In a system wherein queries from network elements made to a foreign network element are sought to be reduced by storage of retrieved data from the foreign network element in a local cache, a method to increase the probability the retrieved data in the local cache matches corresponding data in the foreign network element, the method comprising:
  A. setting a threshold with respect to a number of responses comprising the retrieved data that are provided to the network elements from the local cache in response to queries from the network elements;
  B. when the threshold is exceeded, obtaining the corresponding data from the foreign network element; and
  C. updating the retrieved data with the corresponding data in the local cache.

12. The method of claim 11, wherein the retrieved data comprises calling name information; and wherein the corresponding data comprises corresponding calling name information.

13. The method of claim 11, wherein action B comprises determining the threshold is exceeded by determining that a response to a new query comprises the retrieved data, and by determining that the response added to a previous number of responses results in a new number of responses greater than the number of responses set as the threshold.

14. The method of claim 11, wherein action C comprises updating the retrieved data with the corresponding data in the local cache as updated retrieved data, and setting a time-to-live (TTL) register with respect to the updated retrieved data.

15. The method of claim 14, wherein setting the TTL register with respect to the updated retrieved data comprises updating a previously set TTL register, the previously set TTL register having been set with respect to the retrieved data.

16. In a system wherein queries from network elements made to a foreign network element are sought to be reduced by storage of retrieved data from the foreign network element in a local cache, a method to increase the probability the retrieved data in the local cache matches corresponding data in the foreign network element, the method comprising:
   A. storing a query parameter of a query for the retrieved data in association with the retrieved data;
   B. in response to receipt of a new query for new data, making a determination (1) the new data comprises the retrieved data, and (2) a new query parameter of the new query matches the query parameter for the retrieved data; and
   C. in response to the determination, transmitting the retrieved data from the local cache rather than obtaining the corresponding data from the foreign network element in response to the new query.

17. The method of claim 16, wherein the retrieved data comprises calling name information; wherein the new data comprises the calling name information; and wherein the corresponding data comprises corresponding calling name information.

18. The method of claim 16, wherein action C comprises in response to the determination, transmitting the retrieved data from the local cache rather than obtaining the corresponding data from the foreign network element in response to the new query, and setting a time-to-live (TTL) register with respect to the retrieved data in the local cache.

19. The method of claim 18, wherein setting the TTL register comprises updating a previously set TTL register with respect to the retrieved data.

20. In a system wherein a local cache of a plurality of retrieved data is built to minimize the number of queries to a foreign network element, the plurality of retrieved data having been retrieved from the foreign network element, a method to increase the probability that retrieved data supplied by the local cache in response to a new query matches corresponding data in the foreign network element, the method comprising:
   A. causing the retrieved data, retrieved from a foreign network element in response to a query, to be stored in the local cache so that a query parameter of the query is stored in association with the retrieved data;
   B. in response to receipt of the new query for new data, the new query having a new query parameter, determining the new data is stored in the local cache as the retrieved data;
   C. checking whether the new query parameter of the new query matches the query parameter stored in association with the retrieved data; and
   D. if the new query parameter matches the query parameter, then providing a response to the new query, the response including the retrieved data stored in the local cache,
   whereby a match between the new query parameter and the query parameter increases the probability the retrieved data supplied from the local cache matches the corresponding data in the foreign network element.

21. The method of claim 20, further comprising:
   E. if the new query parameter fails to match the query parameter, obtaining the corresponding data from the foreign network element; and
   F. providing the corresponding data from the foreign network element in response to the new query.

22. In a system wherein queries from network elements of a foreign network element are sought to be reduced by storage of retrieved data from the foreign network element in a local cache, a method to increase the probability the retrieved data in the local cache matches corresponding data in the foreign network element, the method comprising:
   A. setting a time-to-live (TTL) register with respect to the retrieved data in the local cache;
   B. determining the TTL register is expired; and
   C. in response to expiration of the TTL register, obtaining the corresponding data from the foreign network element; and
   D. updating the retrieved data with the corresponding data in the local cache.

23. The method of claim 22, wherein the retrieved data comprises calling name information; and wherein the corresponding data comprises corresponding calling name information.

24. The method of claim 22, wherein action D comprises updating the retrieved data with the corresponding data in the local cache as updated retrieved data, and setting the TTL register with respect to the updated retrieved data.

25. The method of claim 22, wherein action B comprises determining the TTL register is expired as a result of checking the TTL register in response to receipt of a query for the retrieved data.

26. In a system wherein network elements make a number of queries of a foreign network element, an intelligent network element (INE) that reduces the number of queries from the network elements to the foreign network element and that provides accurate data to the network elements, the INE comprising:
   a local cache for storing data received in a response from the foreign network element;
   a time-to-live (TTL) register functionally connected to the local cache for setting a time with respect to the data stored in the local cache;
   an intercept module operative to receive from a network element a query for the data;
   a control module functionally connected to the intercept module, and operative to receive the query from the intercept module; and
   service logic functionally connected to the control module, operative to receive the query from the control module, to determine the data sought in the query is stored in the local cache, to check the time of the TTL register with respect to the data, and if the time has not expired, to cause the data to be provided to the network element in response to the query,
   whereby the number of queries from the network elements to the foreign network element are reduced by storing the data in the local cache and by providing the data in response to the query instead of the foreign network element providing the data, and whereby the data is accurate because it is provided only if a time set with respect to the data has not expired.

27. The INE of claim 26, wherein the service logic is also operative to check that a threshold set with respect to the data has not been exceeded, the threshold having been set as a number of responses comprising the data that is provided to the network elements from the local cache without a refresh of the data, and if the threshold has not been exceeded, to cause the data to be provided to the network element in response to the query.

28. The INE of claim 26, wherein the service logic is also operative to check that an association between an entity associated with the query for the data and another entity associated with the data is satisfied, and if the association has been satisfied, to cause the data to be provided to the network element in response to the query.

29. The INE of claim 26, wherein the intercept module is also operative to receive from a network element another query for other data;

wherein the control module is also operative to receive the another query from the intercept module; and wherein the service logic is also operative to receive the another query from the control module, to determine the other data sought in the another query is not stored in the local cache, and to transmit the another query to the foreign network element.

30. The INE of claim 26, wherein the intercept module is further operative to receive a response from the foreign network element, the response comprising other data;

wherein the control module is further operative to receive the other data in the response from the intercept module;

wherein the service logic is further operative to receive the other data in the response from the control module;

wherein the local cache is also operative to store the other data in response to receipt of the other data from the service logic; and wherein the TTL register is also operative for setting another time with respect to the other data stored in the local cache, whereby the other data stored in the local cache may be provided in response to any query calling for the other data without the foreign network element having to provide the other data.

* * * * *